(12) United States Patent
Kim et al.

(10) Patent No.: US 7,957,237 B2
(45) Date of Patent: Jun. 7, 2011

(54) RECORDING MEDIUM AND METHOD AND APPARATUS FOR RECORDING DATA

(75) Inventors: Sung Hoon Kim, Seoul (KR); Yong Cheol Park, Seoul (KR)

(73) Assignee: LG Electronics Inc., Seoul (KR)

( * ) Notice: Subject to any disclaimer, the term of this patent is extended or adjusted under 35 U.S.C. 154(b) by 307 days.

(21) Appl. No.: 12/320,314

(22) Filed: Jan. 23, 2009

(65) Prior Publication Data

US 2009/0213707 A1 Aug. 27, 2009

(30) Foreign Application Priority Data

Feb. 21, 2008 (KR) ........................ 10-2008-0015894

(51) Int. Cl.
*G11B 7/00* (2006.01)
(52) U.S. Cl. ................ 369/47.27; 369/275.3; 369/59.25
(58) Field of Classification Search ............... 369/53.21, 369/53.11, 275.3, 59.25, 47.13, 275.2, 47.1, 369/47.27, 44.26; 386/241, 260; 711/168
See application file for complete search history.

(56) References Cited

U.S. PATENT DOCUMENTS

| | | | | |
|---|---|---|---|---|
| 6,072,759 A | * | 6/2000 | Maeda et al. | 369/59.25 |
| 6,580,682 B1 | * | 6/2003 | Kamperman et al. | 369/275.3 |
| 6,598,135 B1 | * | 7/2003 | MacLeod | 711/163 |
| 6,724,705 B1 | * | 4/2004 | Ko et al. | 369/53.21 |
| 7,173,889 B2 | * | 2/2007 | Kitani et al. | 369/47.13 |
| 7,327,934 B2 | * | 2/2008 | Kitani | 386/260 |
| 7,403,695 B2 | * | 7/2008 | Kikuchi et al. | 386/241 |
| 7,768,900 B2 | * | 8/2010 | Nagai | 369/275.3 |
| 2002/0105865 A1 | | 8/2002 | Kusumoto et al. | |

FOREIGN PATENT DOCUMENTS

WO   WO 2007/049185   5/2007

OTHER PUBLICATIONS

Extended European Search Report dated Jul. 17, 2009 issued in corresponding Application No. EP 09151223.

* cited by examiner

*Primary Examiner* — Nabil Z Hindi
(74) *Attorney, Agent, or Firm* — Harness, Dickey & Pierce

(57) ABSTRACT

A recording medium and a method and apparatus for recording data are disclosed. The recording medium includes a data area in which data is recorded, a lead-in area arranged radially inwardly of the data area, and a lead-out area arranged radially outwardly of the data area, wherein the lead-in area includes information indicating whether pre-recording has been performed with respect to a portion of the lead-in area.

19 Claims, 7 Drawing Sheets

(BP x) Pre-recorded information code

| b7 | b6 | b5 | b4 | b3 | b2 | b1 | b0 |
|---|---|---|---|---|---|---|---|
| Pre-recorded information code ||||||||

This field shall specify the pre-recorded area on a disc and shall be assigned according to the following rule.

Bit Position 0 : Shall be set to 0b to indicate CDZ is pre-recorded
Bit Position 1 = 0b: Lead-in area except CDZ is not pre-recorded
Bit Position 1 = 1b: Lead-in area except CDZ is pre-recorded
Bit Position 2 to 7 : reserved

FIG. 5

| BP | Contents | Number of bytes |
|---|---|---|
| 0 | Book type and Compatible Part version | 1 |
| 1 | Disc size and Maximum transfer rate of the disc | 1 |
| 2 | Disc structure | 1 |
| 3 | Recorded density | 1 |
| 4 to 15 | Data area allocation | 12 |
| 16 | NBCA descriptor | 1 |
| 17 to 31 | Reserved | 15 |
| 32 to 510 | Reserved | 479 |
| 511 | Disc identifier | 1 |
| 512 to 2047 | Extended PFI information | 1536 |

FIG. 6

(BP x) Pre-recorded information code

| b7 | b6 | b5 | b4 | b3 | b2 | b1 | b0 |
|---|---|---|---|---|---|---|---|
| Pre-recorded information code | | | | | | | |

This field shall specify the pre-recorded area on a disc and shall be assigned according to the following rule.

Bit Position 0 : Shall be set to 0b to indicate CDZ is pre-recorded
Bit Position 1 = 0b: Lead-in area except CDZ is not pre-recorded
Bit Position 1 = 1b: Lead-in area except CDZ is pre-recorded
Bit Position 2 to 7 : reserved

RECORDING MEDIUM AND METHOD AND APPARATUS FOR RECORDING DATA

This application claims the benefit of Korean Patent Application No. 10-2008-0015894, filed on Feb. 21, 2008, which is hereby incorporated by reference as if fully set forth herein.

BACKGROUND OF THE INVENTION

1. Field of the Invention

The present invention relates to a recording medium and a method and apparatus for recording data, and more particularly, to a recording medium and a method of recording data and apparatus in which data can be recorded by the user.

2. Discussion of the Related Art

Recently, with the development of technologies, a variety of recording media and recording/reproducing apparatuses have come into being. The types of such recording media may include, for example, a compact disc (CD), a digital versatile disc (DVD), and a Blu-ray Disc (BD). The CD, DVD and BD may also include various types. For example, the DVD may include various types such as a DVD-R, DVD+R, DVD-RW, DVD-RAM and DVD-ROM having different functions and/or structures. For these recording media, great importance is attached to a method for making a distinction among the recording media, and compatibility among the recording media.

In connection with a distinction and compatibility among such recording media, in the case of a writable recording medium, among the recording media, pre-recording must be performed on a lead-in area of the recording medium for recording of data on the recording medium. However, there is no determination as to whether the pre-recording shall be performed by the manufacturer of the recording medium or by the user before recording of data. Further, there is no determination as to details of pre-recording conditions.

SUMMARY OF THE INVENTION

An object of the present invention devised to solve the problem lies on a recording medium and a method of recording data and apparatus in which a determination can be readily made as to whether to perform pre-recording before data is recorded on the recording medium.

Another object of the present invention devised to solve the problem lies on a recording medium and a method of recording data and apparatus in which a determination can be made as to whether to perform pre-recording on a portion of the recording medium.

The object of the present invention can be achieved by providing a recording medium including: a data area in which data is recorded; a lead-in area arranged radially inwardly of the data area; and a lead-out area arranged radially outwardly of the data area, wherein the lead-in area includes information indicating whether pre-recording has been performed with respect to a portion of the lead-in area.

The lead-in area may include a control data zone including physical format information of the recording medium, the physical format information including information indicating whether the pre-recoding has been performed with respect to the control data zone.

The physical format information may further include information indicating whether the pre-recoding has been performed with respect to zones of the lead-in area, except the control data zone.

The lead-in area may further include a start zone, a reference code zone, and a buffer zone.

The pre-recoding might be performed with respect to the control data zone and the pre-recording may have not been performed with respect to the start zone, reference code zone and buffer zone.

The data may be externally downloaded and recorded. Also, the data may be encrypted and recorded. At this time, the data may be encrypted by a content scramble system (CSS). The recording medium may be a digital versatile disc (DVD)-Download disc.

In another aspect of the present invention, provided herein is a data recording method including: determining whether pre-recording has been performed with respect to a portion of a lead-in area of a recording medium; downloading data externally; and recording the data on the recording medium.

The step of determining may include: determining whether the pre-recording has been performed with respect to a control data zone of the lead-in area including physical format information; and determining whether the pre-recoding has been performed with respect to zones of the lead-in area, except the control data zone.

The lead-in area may further include a start zone, a reference code zone, and a buffer zone.

The data recording method may further include, before the step of recording, performing the pre-recording with respect to the start zone, reference code zone and buffer zone.

In a further aspect of the present invention, provided herein is an apparatus of recording data including: a pickup for recording data on a recording medium and performing pre-recording with respect to a portion of a lead-in area of the recording medium; and a controller for determining whether the pre-recording has been performed with respect to a portion of the lead-in area of the recording medium, based on information indicating whether the pre-recording has been performed, stored on the recording medium, and controlling the pickup to record the data on the recording medium.

The controller may determine whether the pre-recording has been performed with respect to a control data zone of the lead-in area including physical format information and whether the pre-recording has been performed with respect to zones of the lead-in area, except the control data zone.

According to a recording medium and a method of recording data and apparatus of the present invention, before data is recorded on the recording medium, a determination can be readily made as to whether pre-recording has been performed.

Further, according to the present invention, the manufacturer of the recording medium can selectively perform the pre-recording with respect to only a portion of a lead-in area, thereby curtailing a manufacturing cost of the recording medium.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 5 is a schematic view illustrating the structure of physical format information in FIG. 4.

FIG. 6 is a schematic view illustrating information indicating whether pre-recording has been performed.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
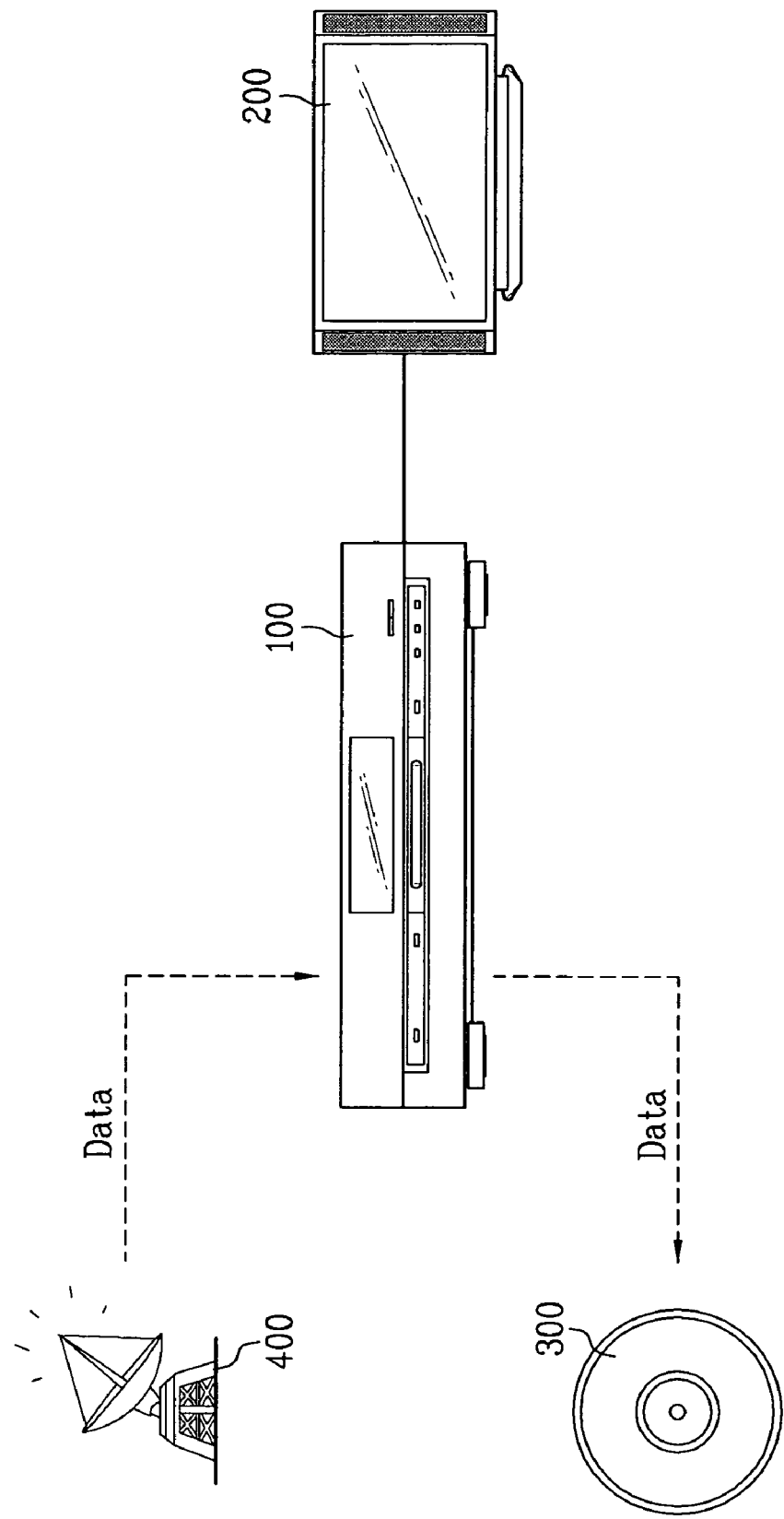
FIG. 1 is a conceptual diagram showing an example of use of a data recording apparatus according to an exemplary embodiment of the present invention, linked with peripheral devices.

FIG. 1 is a schematic view showing an example of use of a data recording apparatus 100 according to an exemplary embodiment of the present invention with peripheral devices.

The recording apparatus 100 is a device that can record or reproduce data on optical discs of various standards. Alternatively, the recording apparatus 100 may be designed to record or reproduce data on only an optical disc of a specific standard. Also, the recording apparatus 100 may perform only the recording function or perform both the recording and reproducing functions.

The recording apparatus 100 may record or reproduce data on only a specified recording medium 300. In this case, the recording apparatus 100 has a function capable of recognizing whether the recording medium 300 is a medium appropriate to the recording/reproduction.

The recording apparatus 100 receives data from an external contents provider 400 and records the received data on the recording medium 300. Also, the recording apparatus 100 transfers data recorded on the recording medium 300 as an image to the user through an external display 200. Here, contents mean data provided from the manufacturer of the recording medium 300 or the contents provider 400.

The contents provider 400 may be, for example, digital multimedia broadcasting (DMB) or Internet. In particular, because anyone can easily access the Internet at present, the user can download, store and utilize specific data on the Internet through the recording apparatus 100.

In this case, contents may be encrypted so that they can be prevented from being illegally copied or downloaded. For example, contents may be encrypted and stored according to a content scramble system (CSS) or advanced access content system (AACS) standard.

In this case, the recording medium 300 may be a dedicated recording medium for recording encrypted contents provided from the contents provider 400. In particular, the recording medium 300 may be a DVD-Download disc.

In this case, the recording apparatus 100 may also be a dedicated recording apparatus for recording and reproducing encrypted contents to protect the copyright on the contents. However, in the case of reproduction, the contents may be reproduced by various types of reproducing apparatuses for compatibility thereof.

Various methods may be used for the download-based data recording/reproduction as mentioned above. One example of such methods may be a Manufacturing On Demand (MOD) method for receiving and recording commercially encrypted contents. In this MOD method, contents are received through the recording apparatus 100 specified by the contents provider 400 and a dedicated line and then recorded on the recording medium 300. Adopted as the recording medium 300 may be a recording medium specified to record encrypted contents provided from the contents provider 400, rather than a general recording medium.

Also, the recording apparatus 100 may have a large-capacity storage, in which contents provided from the contents provider 400 may be stored. The user may select a desired content from the storage and store the selected content on the specified recording medium 300.

On the other hand, an Electronic Sell Through (EST) method may be used which the user downloads and stores contents using a personal computer (PC). The EST method is similar to the MOD method, with the exception that the user downloads contents provided from the contents provider 400 to the PC using a network such as the Internet.

Also, the user may record the contents provided from the contents provider 400 using a separate recording apparatus 100 specified by the contents provider 400, besides the PC. In this case, the security level of the recording medium 300 may also increase by a certain step as compared with that in the MOD method, because the contents may be more readily and illegally used by the EST method. For example, a device key may be inserted in the recording medium 300.

Figure 2:
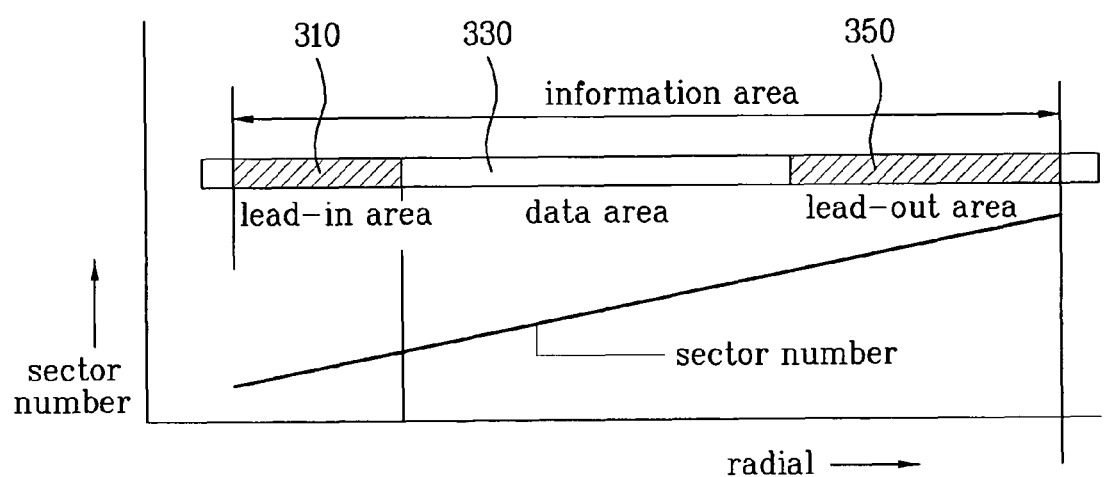
FIG. 2 is a schematic view showing the structure of a recording medium according to an exemplary embodiment of the present invention.

FIG. 2 is a schematic view showing a sector structure of an information area of a writable recording medium according to an exemplary embodiment of the present invention. Hereinafter, a description will be given in connection with a DVD-Download disc as an example.

As shown in FIG. 2, the writable recording medium according to the present exemplary embodiment has a plurality of tracks including a lead-in area 310, a data area 330, and a lead-out area 350 arranged from the center of the recording medium. A physical sector number increases from the lead-in area 310 toward the lead-out area 350, namely, from the inner periphery of the disc toward the outer periphery of the disc. User data, etc. are recorded in the data area 330. This user data may be data externally downloaded.

Figure 3:
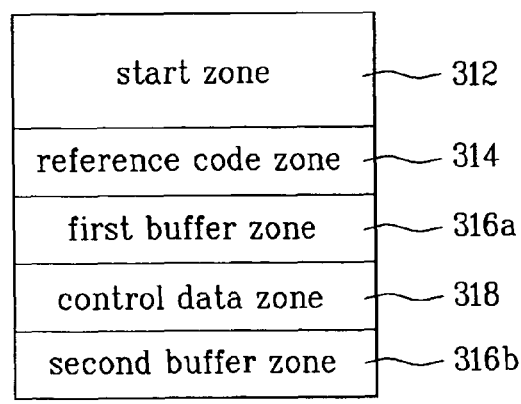
FIG. 3 is a schematic view of a lead-in area in FIG. 2.

FIG. 3 is a schematic view of the lead-in area 310 in FIG. 2. The lead-in area 310 includes a start zone 312, a reference code zone 314, a first buffer zone 316*a*, a control data zone 318, and a second buffer zone 316*b*.

Figure 4:
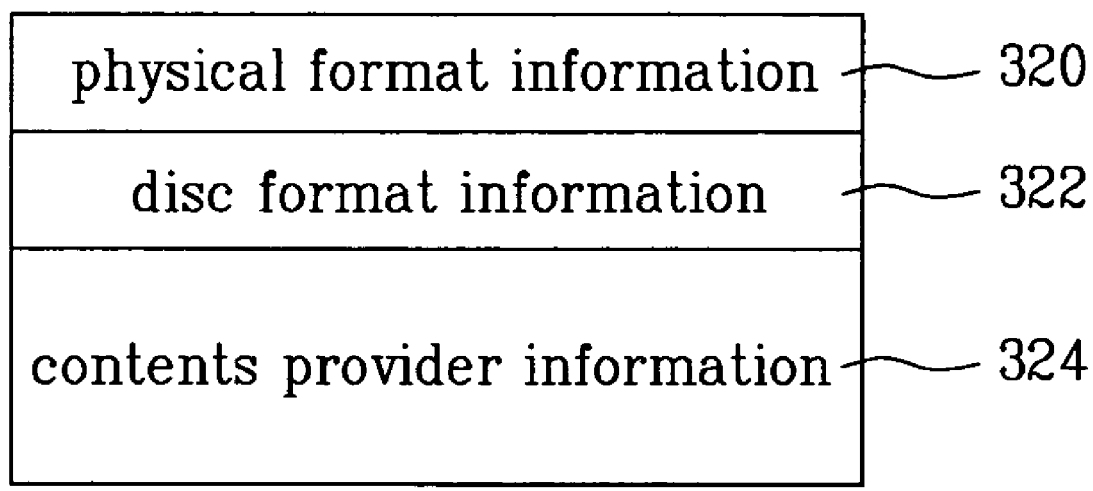
FIG. 4 is a schematic view of a control data zone in FIG. 3.

FIG. 4 is a schematic view of the control data zone 318 in FIG. 3. The control data zone 318 includes physical format information 320, disc format information 322, and contents provider information 324. FIG. 5 is a schematic view illustrating the structure of the physical format information 320 in FIG. 4, in which a DVD-Download single layer disc is taken as an example. Information indicating whether pre-recording for data recording has been performed may be recorded in a reserved area of the physical format information 320 shown in FIG. 5.

Here, in order to record data in the data area 330 of the recording medium according to the present embodiment, it is necessary to perform the pre-recording with respect to the start zone 312, reference code zone 314, first buffer zone 316*a*, second buffer zone 316*b* and control data zone 318 of the lead-in area 310.

In the case where the pre-recording is performed with respect to all these zones in a manufacturing process of the recording medium, the user does not need to separately perform the pre-recording in a data recording process. However, the performing of the pre-recording in the manufacturing process results in an increase in manufacturing cost of the recording medium.

In this connection, it is preferable that, as needed, the manufacturer of the recording medium performs the pre-recording with respect to some zones of the lead-in area and the user performs the pre-recording with respect to the other zones of the lead-in area before recording user data. Particularly, in the case where the recording medium is a DVD-Download disc in which the recording must be performed with respect to all of the data area irrespective of the size of user data, the recording time does not increase relatively significantly due to the pre-recording. As a result, for this type of recording medium, it is efficient that the manufacturer performs the pre-recording with respect to a portion of the lead-in area and the user performs the pre-recording with respect to the remaining portion of the lead-in area.

Therefore, the recording medium according to the present embodiment includes pre-recorded information separately indicating whether the pre-recording has been performed with respect to some zones of the lead-in area.

FIG. 6 is a schematic view illustrating information indicating whether the pre-recording has been performed. As shown in FIG. 6, a pre-recorded information code is set in the physical format information of the recording medium to indicate whether the pre-recording has been performed with respect to the control data zone and the remaining zones of the lead-in area of the recording medium, except the control data zone.

In FIG. 6, a bit position 0 b0 indicates whether the pre-recording has been performed with respect to the control data zone, and a bit position 1 b1 indicates whether the pre-recording has been performed with respect to the remaining zones of the lead-in area, except the control data zone, namely, the start zone, reference code zone and buffer zones.

Here, the bit position 0 b0 is set to 0b because the pre-recording has been performed by the recording medium manufacturer. Also, the bit position 1 b1 indicates whether the pre-recording has been performed with respect to the remaining zones of the lead-in area, except the control data zone, namely, the start zone, reference code zone and buffer zone.

Figure 7:
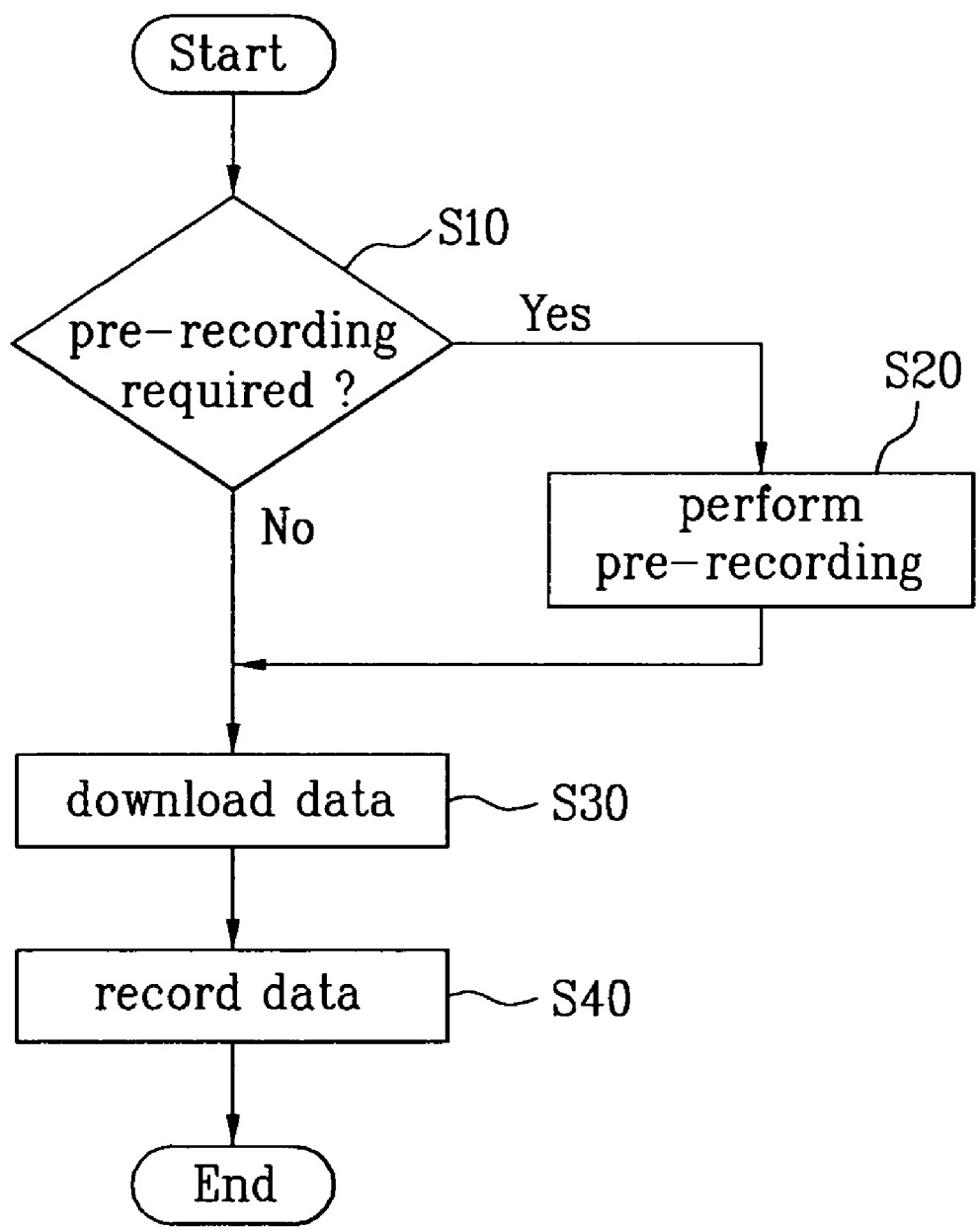
FIG. 7 is a flowchart illustrating a method of recording data according to an exemplary embodiment of the present invention.

FIG. 7 is a flowchart illustrating a method of recording data according to an exemplary embodiment of the present invention, which is executed by the user. First, the user determines whether pre-recording is required, based on information indicating whether the pre-recording has been performed, stored on a recording medium (S10). At this time, as stated above, the user can determine whether the pre-recording is required for some zones of a lead-in area, based on a pre-recording completion flag set in a reserved area of physical format information of a control data zone of the lead-in area.

In the case where it is determined based on the aforementioned information that the pre-recording is required, the pre-recording is performed with respect to the recording medium (S20). That is, when the bit position 1 b1 of FIG. 6 is 0b, namely, when the pre-recording has been performed with respect to the control data zone by the manufacturer, the user performs the pre-recording with respect to the remaining zones of the lead-in area, except the control data zone. When the pre-recording is completed by the user in this manner, the bit position 1 b1 of FIG. 6 is set to 1b.

Thereafter, the user downloads data from a contents provider (S30). On the other hand, in an MOD method where a data recording apparatus has a large-capacity storage and contents provided from the contents provider are stored in the storage, because data is pre-stored, the user can select a desired content from the storage and store the selected content on a specified recording medium, without downloading the data. At this time, the downloaded data may be data encrypted according to a CSS or MCS standard. Thereafter, the user records the downloaded data on the recording medium (S40).

Figure 8:
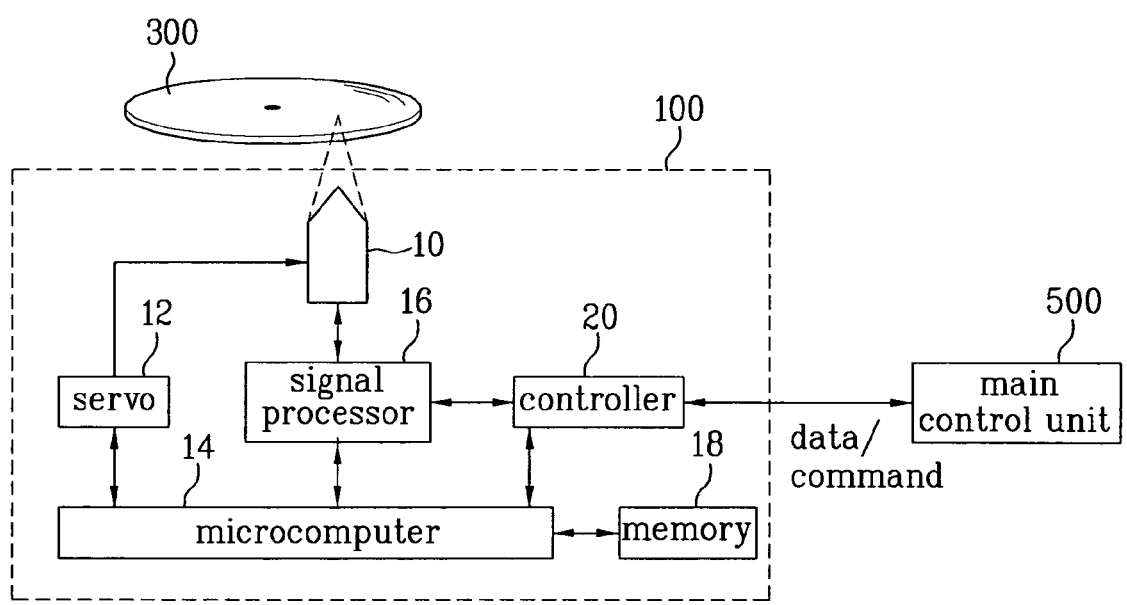
FIG. 8 is a schematic view of a recording/reproducing system according to an exemplary embodiment of the present invention.

FIG. 8 is a schematic view of a recording/reproducing system according to an exemplary embodiment of the present invention. As shown, the recording/reproducing system broadly includes a data recording apparatus 100, and a main control unit 500 for controlling the data recording apparatus 100.

The recording apparatus 100 includes a pickup 10, a servo 12, a microcomputer 14, a signal processor 16, a memory 18, and a controller 20.

The pickup 10 includes a laser diode (LD), and records data on the surface of a recording medium 300 or reads a signal reflected from the surface of the recording medium 300.

The signal processor 16 receives the signal read by the pickup 10 and restores the received signal to its original signal value, in a data reproduction mode, and modulates data to be recorded into a signal to be recorded on the recording medium 300 and transfers the modulated signal to the pickup 10, in a data recording mode.

The microcomputer 14 generates control signals for control of tracking and focusing operations of the pickup 10 in response to output signals from the signal processor 16.

The servo 12 controls the tracking and focusing operations of the pickup 10 in response to the control signals generated by the microcomputer 14.

The memory 18 performs a buffer function to temporarily store management information, etc. of the recording medium 300 or data to be recorded/reproduced.

The controller 20 controls to verify reliability of data in response to the user's recording or reproduction command from the main control unit 500. Also, the controller 20 determines whether pre-recording is required, based on information indicating whether the pre-recording has been performed, read from a signal detected by the pickup 10, and controls the pickup 10 to perform the pre-recording, upon determining that the pre-recording is required. Here, as stated previously, the information indicating whether the pre-recording has been performed separately indicates whether the pre-recording has been performed with respect to some zones of a lead-in area.

The main control unit 500 transfers the recording/reproduction command to the controller 20 of the recording apparatus 100 and controls the entire system. The main control unit 500 may be a main controller of a computer, server, audio device or video device. That is, the recording apparatus 100 may be an optical drive provided in a PC or the like, or a player not installed in a PC or the like.

Therefore, the recording apparatus 100 according to the present exemplary embodiment is applicable to both an optical drive that is installed and run in a PC or the like and a player that is utilized as a stand-alone product.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A recording medium comprising:
a data area;
a lead-in area arranged radially inwardly of the data area, the lead-in area including a control data zone,
the control data zone including physical format information of the recording medium,
the physical format information including,
information indicating whether pre-recoding has been performed with respect to the control data zone, and information indicating whether the pre-recoding has been performed with respect to zones of the lead-in area, except the control data zone; and a lead-out area arranged radially outwardly of the data area.

2. The recording medium of claim 1, wherein the lead-in area further includes a start zone, a reference code zone, and a buffer zone.

3. The recording medium of claim 2, wherein the pre-recoding has been performed with respect to the control data zone and the pre-recording has not been performed with respect to the start zone, reference code zone and buffer zone.

4. The recording medium of claim 1, wherein the data is externally downloaded and recorded.

5. The recording medium of claim 4, wherein the data is encrypted.

6. The recording medium of claim 5, wherein the data is encrypted by a content scramble system (CSS).

7. The recording medium of claim 6, wherein the recording medium is a digital versatile disc (DVD)-Download disc.

8. A method of recording data on a recording medium including a data area, a lead-in area and a lead-out area, the method comprising:

determining whether pre-recording has been performed with respect to a control data zone of the lead-in area based on physical format information stored in the control data zone;

determining whether the pre-recording has been performed with respect to zones of the lead-in area except the control data zone based on the physical format information:

downloading data externally; and recording the data on the recording medium.

9. The method of recording data of claim 8, wherein the lead-in area further includes a start zone, a reference code zone, and a buffer zone.

10. The method of recording data of claim 9, further comprising, before the recording, performing the pre-recording with respect to the start zone, reference code zone and buffer zone.

11. The method of recording data of claim 8, further comprising encrypting the downloaded data.

12. The method of recording data of claim 11, wherein, at the encrypting, the data is encrypted by a content scramble system (CSS).

13. The method of recording data of claim 12, wherein the recording medium is a digital versatile disc (DVD)-Download disc.

14. An apparatus of recording data on a recording medium including a data area, a lead-in area and a lead-out area, the method comprising:

a pickup configured to,
record data on the recording medium and to
perform pre-recording with respect to a portion of the lead-in area; and a controller configured to,
determine whether the pre-recording has been performed with respect to a control data zone of the lead-in area based on physical format information stored in the control data zone,
determine whether the pre-recording has been performed with respect to zones of the lead-in area except the control data zone based on the physical format information, and
control the pickup to record the data on the recording medium.

15. The apparatus of claim 14, wherein the lead-in area further includes a start zone, a reference code zone, and a buffer zone.

16. The apparatus of claim 15, further comprising an encrypter configured to encrypt the downloaded data.

17. The apparatus of claim 16, wherein the encrypter encrypts the data by a content scramble system (CSS).

18. The apparatus of claim 17, wherein the recording medium is a digital versatile disc (DVD)-Download disc.

19. The apparatus of claim 14, further comprising:

a main controller configured to transfer a recording command to the controller.

* * * * *